(12) United States Patent
Ramesh et al.

(10) Patent No.: US 9,698,597 B1
(45) Date of Patent: Jul. 4, 2017

(54) ADJUSTABLE POWER AND SYSTEM EFFICIENCY MAXIMIZING SCHEME USING MICRO-CONTROLLERS

(71) Applicant: Atmel Corporation, San Jose, CA (US)

(72) Inventors: Girish Ramesh, Campbell, CA (US); Karthik Rau, San Jose, CA (US)

(73) Assignee: Atmel Corporation, San Jose, CA (US)

( * ) Notice: Subject to any disclaimer, the term of this patent is extended or adjusted under 35 U.S.C. 154(b) by 569 days.

(21) Appl. No.: 13/676,481

(22) Filed: Nov. 14, 2012

(51) Int. Cl.
  *H02J 1/10* (2006.01)
  *H02M 1/00* (2006.01)
  *G05F 1/10* (2006.01)
  *H02J 3/00* (2006.01)

(52) U.S. Cl.
  CPC ............... *H02J 1/10* (2013.01); *G05F 1/10* (2013.01); *H02J 2003/003* (2013.01); *H02M 2001/0003* (2013.01)

(58) Field of Classification Search
  CPC ...... H02J 1/10; H02J 2003/003; H02M 3/335; H02M 2001/0003; G05F 1/10
  See application file for complete search history.

(56) References Cited

U.S. PATENT DOCUMENTS

| | | | |
|---|---|---|---|
| 5,977,732 A * | 11/1999 | Matsumoto | 318/283 |
| 6,134,129 A * | 10/2000 | Keller | H02J 1/102 307/58 |
| 6,465,993 B1 * | 10/2002 | Clarkin | H02M 3/156 323/272 |
| 8,816,757 B1 * | 8/2014 | Yabbo | G06F 1/30 327/538 |
| 2007/0184339 A1 * | 8/2007 | Scheucher | 429/99 |
| 2008/0130321 A1 * | 6/2008 | Artusi et al. | 363/21.01 |
| 2008/0203992 A1 * | 8/2008 | Qahouq | H02M 3/157 323/299 |
| 2009/0040791 A1 * | 2/2009 | Qahouq | H02M 3/1588 363/21.01 |
| 2010/0019574 A1 * | 1/2010 | Baldassarre et al. | 307/23 |
| 2013/0076327 A1 * | 3/2013 | Wagoner | H02M 1/32 323/304 |
| 2014/0060100 A1 * | 3/2014 | Bryson | H02J 3/385 62/235.1 |

* cited by examiner

*Primary Examiner* — Zeev V Kitov
(74) *Attorney, Agent, or Firm* — Fish & Richardson P.C.

(57) ABSTRACT

A method performed by a circuit for managing power, the method comprising: receiving a plurality of voltages at a microcontroller, where each voltage is associated with a distinct power supply; determining one or more voltages of the plurality of voltages are being or will be adjusted by the respective power supply; in response to the determining, optimizing, using the microcontroller, one or more parameters of one or more of the power supplies to minimize power loss.

18 Claims, 3 Drawing Sheets

ADJUSTABLE POWER AND SYSTEM EFFICIENCY MAXIMIZING SCHEME USING MICRO-CONTROLLERS

TECHNICAL FIELD

This disclosure relates generally to electronics and more particularly to power managers.

BACKGROUND

A power manager can control, regulate, and distribute DC power throughout a system. The power manager can turn off and on power to the system, or it can switch the system to a low-power state. The power manager can control a power supply, which provides power to a load of the system.

When the power manager is operating, the system experiences switching, conduction, and magnetization losses. Switching losses occur when switches, e.g., transistors, are turned off and on, causing charging and discharging of capacitors. Conduction losses occur due to parasitic resistance. Magnetization losses occur with switching in transformers and inductors. These losses are affected by factors including a power conversion ratio of input to output voltage in the system, switching frequency, output load current, and system temperature.

The system can also experience transient spikes when load to the system or output voltage is adjusted. Transient spikes can cause system instability and unsteady output voltage from the power supply.

SUMMARY

A power manager can control multiple power supplies operating in a system. The power manager includes a microcontroller. The microcontroller receives information about the power supplies, e.g., output voltages. Based on the information, the microcontroller determines output voltages of one or more of the power supplies are or will be adjusted. The output voltages can be changing in real time or have already changed. When the microcontroller detects the voltage adjustments, the microcontroller optimizes one or more parameters of one or more power supplies to minimize power loss. For example, the microcontroller can modify output voltages or switching frequencies of the power supplies. Furthermore, the microcontroller can also monitor load conditions and adjust output voltages prior to a change in load current to reduce a transient response.

In one aspect, a method performed by a circuit for managing power, the method comprising: receiving a plurality of voltages at a microcontroller, where each voltage is associated with a distinct power supply; determining one or more voltages of the plurality of voltages are being or will be adjusted by the respective power supply; in response to the determining, optimizing, using the microcontroller, one or more parameters of one or more of the power supplies to minimize power loss.

Implementations can include one or more of the following. The one or more parameters include one or more of the following: output voltage, input voltage, switching frequency, or output load current. The optimizing occurs during power up of the microcontroller. The optimizing comprises sweeping for different values for the one or more parameters to minimize input power. The optimizing occurs upon receiving an external signal at the microcontroller. The optimizing comprises: receiving load conditions from each of the power supplies, where the load conditions provide an indication of a future load current based on the respective load of the power supply; adjusting respective output voltages of the one or more power supplies based at least on the load conditions and the one or more parameters. The microcontroller is configured to provide adaptive load line programming.

Particular implementations of the voltage scaling system can provide one or more of the following advantages: 1) the system reduces power loss by optimizing parameters of power supplies during voltage adjustment; and 2) the system reduces transient response by monitoring load conditions and preemptively transitioning output voltages based on the load conditions.

The details of one or more disclosed implementations are set forth in the accompanying drawings and the description below. Other features, aspects, and advantages will become apparent from the description, the drawings and the claims.

DETAILED DESCRIPTION

Example Power Management System

Figure 1:
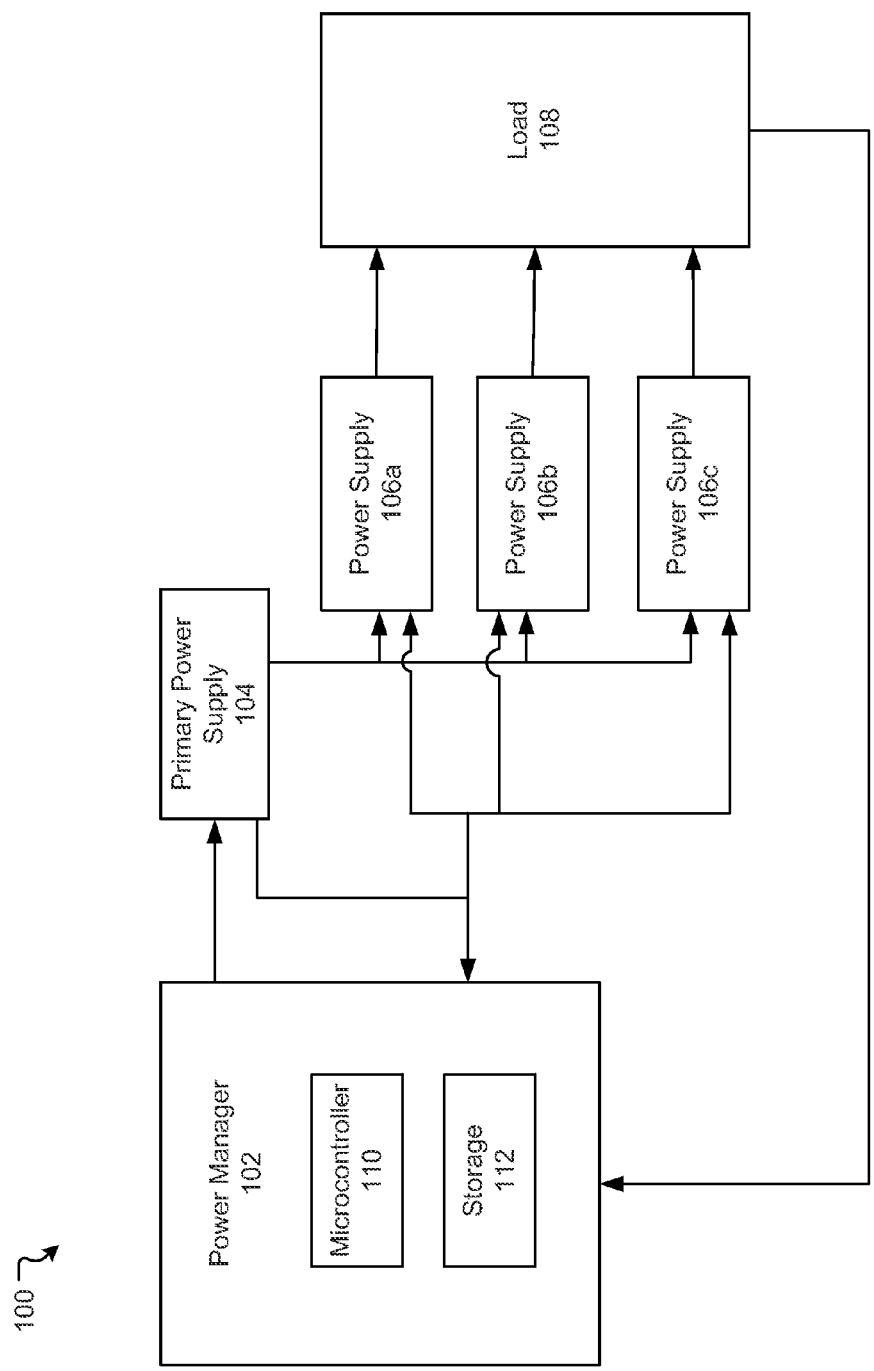
FIG. 1 is a schematic diagram of an example power management system.

FIG. 1 is a schematic diagram of an example power management system 100. The power management system 100 includes a power manager 102, multiple power supplies 104, 16a-c, and a load 108. The power manager 102 controls the power supplies 104, 106a-c, and the power supplies 104, 106a-c can provide information to the power manager 102. The interaction and information exchange between the power manager 102 and the power supplies 104, 106a-c will be described further below in reference to FIG. 2.

The power manager 102 includes a microcontroller 110. The microcontroller 110 processes information from the power supplies 104, 106a-c to control and distribute power. By having access to information from multiple power supplies, the microcontroller can optimize parameters of each power supply to minimize power loss. Optimization will be described further below in reference to FIG. 2.

The power supplies 104, 106a-c include a primary power supply 104 and secondary power supplies 106a-c. The primary power supply 104 is a main source of power to the system. The primary power supply 104 can be powered by a system input power, e.g., power from alternating current (AC) mains or power from a motherboard. The primary power supply 104 outputs an intermediate voltage, which acts as an input voltage to each secondary power supply. In some implementations, the primary power supply 104 is coupled to a varying number of power supplies, e.g., more than three power supplies. Each secondary power supply can bias the intermediate voltage to output different voltage levels.

Each power supply can operate based on one or more parameters. Some parameters are adjustable while others are not. For example, each power supply can provide a measure of an input and an output voltage, e.g., which can be represented as a power conversion ratio, a switching frequency, and an output load current. The power supply can adjust these parameters to cause a different output behavior to decrease power loss and reduce a transient response. In some implementations, the power supply monitors its internal temperature and provides it to the microcontroller, e.g., using an internal thermometer.

The power management system 100 includes a load 108. The load 108 can include data processing apparatus, e.g., multiple servers, that handle variable amounts of load. In some implementations, one power supply, e.g., supply 106a, powers a first part of the load 108 while another power supply, e.g., supply 106b, powers a second part of the load 108. Some data processing apparatus can experience heavy amounts of network traffic (heavier load) while other data processing apparatus experience light amounts of network traffic (lighter load). The power manager 102 can adjust respective output voltages of the power supplies based on their respective loads. That is, the power manager 102 can increase or decrease the output voltages of the power supplies in proportion to the amount of load.

In some implementations, the power manager 102 receives feedback from the load 108. The feedback can be data that indicate load conditions of the load 108 (or parts of the load). The load conditions can include a current load level, e.g., a current output current experienced by the load, or a future load level, e.g., a predicted output current that will be experienced by the load. Load conditions will be described further below in reference to FIG. 2.

In some implementations, the power manager 102 includes storage 112. The storage 112 can be a hard disk or similar storage medium. The microcontroller 110 can store and access information provided by the load 108 or the power supplies 104, 106a-c in storage 112. For example, in case of a power failure, the microcontroller 110 can receive notice of the failure. The microcontroller 110 can access the information received from the power supplies, e.g., the current load conditions can be stored in Random Access Memory (RAM). The microcontroller can archive the information in storage 112 when the system fails to prevent data loss. Once the power management system 100 restarts and continues to operate normally, the microcontroller 110 can access the storage 112, unarchive the information, and resume processing the received data.

Example Power Management System Flowchart

Figure 2:
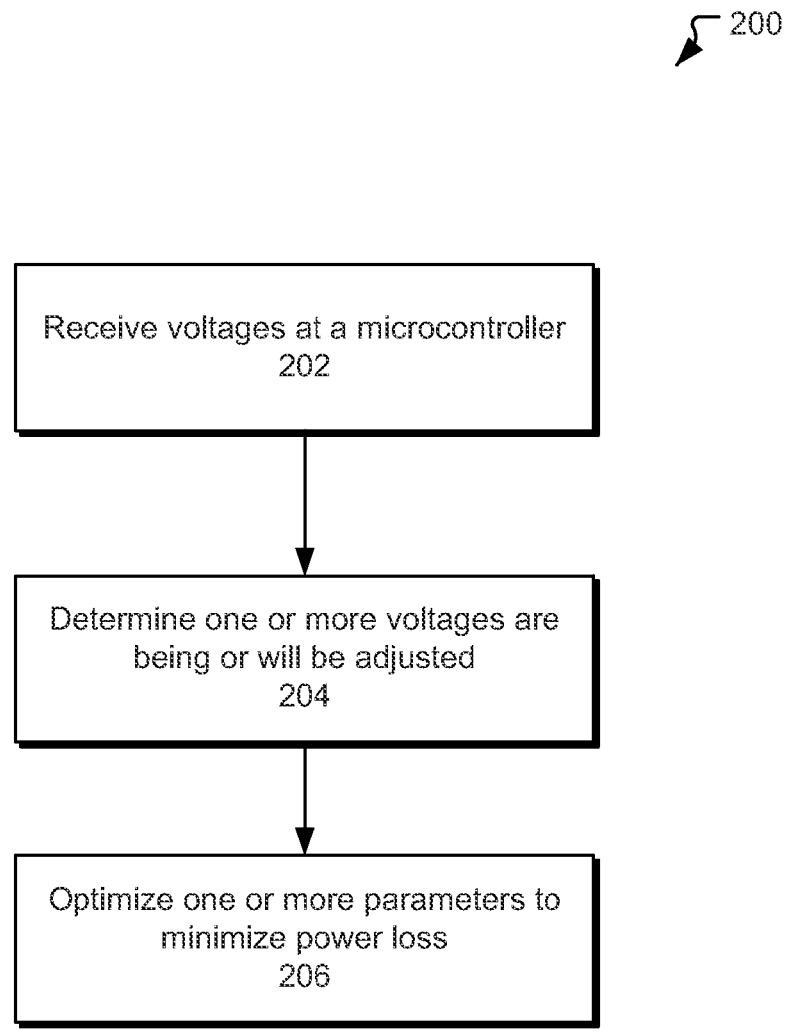
FIG. 2 is a flow diagram of an example process performed by a power management system.

FIG. 2 is a flow diagram of an example process performed by a power management system, e.g., the power management system 100 described above in reference to FIG. 1. A microcontroller 110 can receive voltage values from the power supplies 104, 106a-c (step 202). In some implementations, the microcontroller 110 receives the voltage values from an intermediary, e.g., a power supply controller that controls a power supply's output voltage. The voltage values can be respective current output voltages of the power supplies, or the voltage values can be respective future output voltages of the power supplies.

The microcontroller 102 can determine whether one or more voltages of the power supplies are or will be adjusted (step 204). The microcontroller 102 can receive a current voltage value, e.g., from a respective power supply, and monitor the value. If the value is changing, the microcontroller 102 can determine the power supply is being adjusted. Alternatively, the microcontroller 102 can also receive a signal from a respective power supply that indicates whether the power supply is transitioning output voltage. On the other hand, the microcontroller 102 can receive another signal that indicates one or more voltages will be adjusted in the future, e.g., the adjustments may occur within the next few milliseconds.

In response to the determining, the microcontroller 102 can optimize one or more parameters of one or more power supplies to minimize power loss. For example, the microcontroller 102 can sweep for different values of the parameters that minimize input power of the power supplies. The parameters are described above in reference to FIG. 1. In some implementations, the optimizing occurs during startup of the microcontroller 102. In some other implementations, the optimizing occurs upon receiving an external signal at the microcontroller. For example, a power supply can indicate a change in its parameters and can notify the microcontroller. The microcontroller can re-sweep values of the parameters to determine optimal parameters for the system. In some implementations, users program an algorithm in firmware of the microcontroller. The algorithm can change one or more parameters more than others.

The microcontroller 102 can determine an output voltage of a power supply at a level that adequately powers the respective load. In the determination, the microcontroller can choose the output voltage such that switching frequency of the voltage is reduced with minor load variation. For example, the microcontroller can establish an output voltage that is high enough for handling minor load variation, which reduces switching frequency of voltages, but low enough to power the load at a minimal level.

In optimizing the parameters, the microcontroller 102 can consider prior information of load variation. Prior information can include a history of load conditions for a part of the load 108 or the whole load 108. The load conditions can include parameters of power supplies, e.g., switching frequency, load current, temperature, or power conversion ratios as discussed above in reference to FIG. 1. The load conditions can also include a required voltage level to be satisfied with a certain amount of load. In some implementations, the microcontroller 102 tracks whether a part of the load 108 is heavier or lighter during certain times. Alternatively, the microcontroller 102 can receive the prior load history from the load 108. For example, a controller of the load 108 can track history of load conditions and provide the history to the microcontroller 102.

The load conditions can indicate a future load at a future time. Based on this load information, the microcontroller 102 can predict a future load. If the microcontroller determines the future load of a power supply may imminently change, e.g., a change in load current is imminent, the microcontroller 102 can start adjusting the output voltage of the power supply before the load occurs. This can reduce sudden variations of output voltage and therefore reduce a transient response, thereby more quickly achieving a stable system. For example, if the load 108 generally increases at 6 AM PT when the stock market opens, the microcontroller can start transitioning output voltages a few moments before 6 AM PT to reduce the time to transition to a higher voltage. As another example, the microcontroller can start transitioning output voltages when it receives an instruction to stream online video.

The microcontroller 102 can also be configured to provide adaptive load line programming. Adaptive load line programming will be described further below in reference to FIG. 3.

Example Timing Diagram

Figure 3:
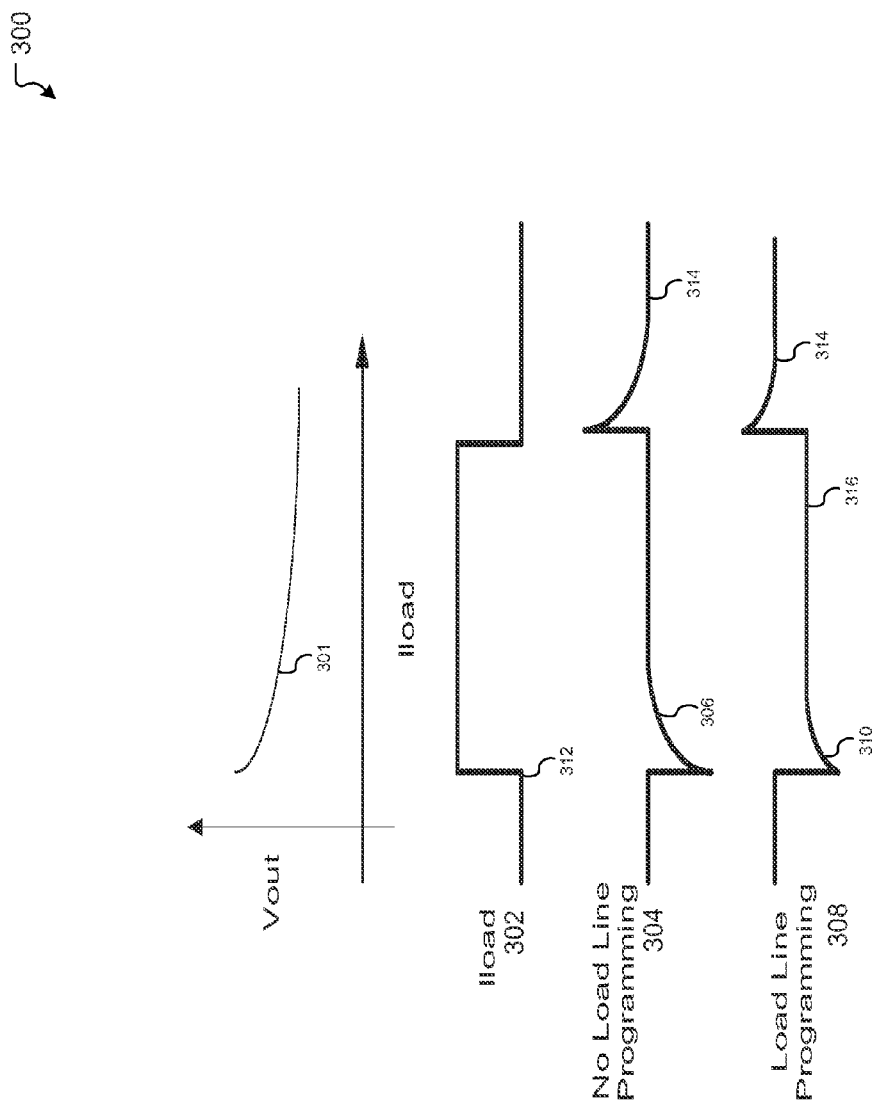
FIG. 3 is an example timing diagram of a power management system when load current adjusts during system operation.

FIG. 3 is an example timing diagram 300 of a power management system when load current adjusts during system operation. Generally, as shown in graph 301, output voltage drops when a load current increases. By way of illustration, when a load current 302 of a power supply increases 312, the output voltage with no load line programming 304 drops and slowly is reestablished to the original output level 314. The output voltage experiences a transient response 306 before reaching the original output voltage. During the transient response, the power supply and the load can be unstable. Similarly, if the load current 302 returns to normal levels, the power supply experiences an increase in output voltage before gradually returning to the original output voltage.

With adaptive load line programming 308, when the load current 302 increases, the output voltage still drops. However, the microcontroller 102 can determine the load does not require as much output voltage as previously provided, e.g., through an algorithm that changes voltage based on load current, and the microcontroller 102 can adapt by establishing a lower output voltage requirement 316 for the power supply. With the lower output voltage requirement, the transient response 310 is reduced and the power supply can require less capacitance. That is, the time to reach a stable voltage level 316 is smaller than without adaptive load line programming. If the load current 302 returns to its original value, the voltage still increases but can slowly decrease to the original output voltage level 314.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A method comprising:
   receiving, at a microcontroller, feedback from a load indicating a future load condition;
   determining that a power supply output voltage coupled to the load is to be changed based on the future load condition; and
   in response to the determining and prior to the future load condition occurring, adjusting the power supply output voltage.

2. The method of claim 1, where the adjusting further comprises adjusting a switching frequency of the output voltage.

3. The method of claim 1, where the adjusting comprises sweeping for different values to minimize input power of the power supply.

4. The method of claim 1, where the adjusting occurs upon receiving an external signal at the microcontroller.

5. The method of claim 1, further comprising storing the future load condition in memory.

6. The method of claim 1, where the microcontroller is configured to adjust the output voltage based at least in part on an internal temperature of the power supply.

7. A system for managing power, the system comprising:
   a plurality of power supplies configured to output a plurality of voltages, respectively, where each power supply is configured to output a respective voltage based on a respective load; and
   a microcontroller, where the microcontroller is configured to receive feedback from a load indicating a future load condition, determine that an output voltage coupled to the load is to be adjusted based on the future load condition by its respective power supply, and where the microcontroller is configured to adjust the output voltage prior to the future load condition occurring.

8. The system of claim 7, where the adjusting comprises sweeping for different values to minimize input power of the power supply.

9. The system of claim 7, where the adjusting comprises adjusting a switching frequency of the output voltage.

10. The system of claim 7, where the adjusting occurs upon receiving an external signal at the microcontroller.

11. The system of claim 7, further comprising storing the future load condition in memory.

12. The system of claim 7, where the microcontroller is configured to adjust the output voltage based at least in part on an internal temperature of the power supply.

13. A microcontroller comprising:
   first circuitry configured to receive feedback from a load indicating a future load condition;
   second circuitry configured to determine that an output voltage of a power supply coupled to the load is to be adjusted by the power supply based on the future load condition; and
   third circuitry configured to adjust the output voltage of the power supply prior to the future load condition occurring.

14. The microcontroller of claim 13, where the adjusting comprises sweeping for different values to minimize input power of the power supply.

15. The microcontroller of claim 13, where the adjusting comprises adjusting a switching frequency of the output voltage.

16. The microcontroller of claim 13, where the adjusting occurs upon receiving an external signal at the microcontroller.

17. The microcontroller of claim 13, further comprising storing the future load condition in memory.

18. The microcontroller of claim 13, wherein the output voltage is adjusted based at least in part on an internal temperature of the power.

* * * * *